US012728639B2

(12) United States Patent
Iwama

(10) Patent No.: US 12,728,639 B2
(45) Date of Patent: Sep. 8, 2026

(54) LIQUID DISCHARGE HEAD, LIQUID DISCHARGE UNIT, AND LIQUID DISCHARGE APPARATUS

(71) Applicant: Masami Iwama, Ibaraki (JP)

(72) Inventor: Masami Iwama, Ibaraki (JP)

(73) Assignee: RICOH COMPANY, LTD., Tokyo (JP)

( * ) Notice: Subject to any disclaimer, the term of this patent is extended or adjusted under 35 U.S.C. 154(b) by 205 days.

(21) Appl. No.: 18/617,749

(22) Filed: Mar. 27, 2024

(65) Prior Publication Data

US 2024/0326428 A1 Oct. 3, 2024

(30) Foreign Application Priority Data

Mar. 30, 2023 (JP) ................................. 2023-055281

(51) Int. Cl.
*B41J 2/14* (2006.01)
*B41J 2/165* (2006.01)
*B41J 2/175* (2006.01)

(52) U.S. Cl.
CPC ......... *B41J 2/14274* (2013.01); *B41J 2/1433* (2013.01); *B41J 2/165* (2013.01); *B41J 2/175* (2013.01)

(58) Field of Classification Search
CPC ................ B41J 2/14233; B41J 2/04581; B41J 2/14201; B41J 2002/14338; B41J 2002/14459; B41J 2202/12; F04B 43/046
See application file for complete search history.

(56) References Cited

U.S. PATENT DOCUMENTS 7,517,061 B2 * 4/2009 Sakamoto .............. B41J 2/1646 347/68
2006/0007272 A1 1/2006 Ogata et al.
(Continued)

FOREIGN PATENT DOCUMENTS

CN 106794696 A 5/2017
CN 107848303 A 3/2018
(Continued)

OTHER PUBLICATIONS

Extended European Search Report issued Aug. 9, 2024 in European Patent Application No. 24165736.0, 7 pages.
(Continued)

*Primary Examiner* — John P Zimmermann
(74) *Attorney, Agent, or Firm* — XSENSUS LLP

(57) ABSTRACT

A liquid discharge head includes a nozzle plate, a common chamber substrate, a channel substrate, a first bridge, and a second bridge. The nozzle plate has multiple nozzles from each of which a liquid is dischargeable in a first direction. The common chamber substrate has a supply-side common chamber having a first supply sidewall and a second supply sidewall in a second direction, and a collection-side common chamber adjacent to the supply-side common chamber in the second direction. The collection-side common chamber has a first collection sidewall and a second collection sidewall in the second direction. The channel substrate is laminated over the common chamber substrate. The first bridge is disposed between the first supply sidewall and the second supply sidewall to bridge the supply-side common chamber. The second bridge is disposed between the first collection sidewall and the second collection sidewall to bridge the collection-side common chamber.

20 Claims, 11 Drawing Sheets

(56) References Cited

U.S. PATENT DOCUMENTS

| | | | | |
|---|---|---|---|---|
| 2010/0328400 | A1 | 12/2010 | Koda et al. | |
| 2013/0002766 | A1 | 1/2013 | Koseki | |
| 2014/0078224 | A1* | 3/2014 | Park | B41J 2/14233 347/71 |
| 2014/0375712 | A1 | 12/2014 | Iwama | |
| 2017/0087835 | A1* | 3/2017 | Tomimatsu | B41J 2/14233 |
| 2017/0253062 | A1 | 9/2017 | Murakami et al. | |
| 2018/0194135 | A1 | 7/2018 | Iwama et al. | |
| 2019/0092011 | A1* | 3/2019 | Nakagawa | B41J 2/1404 |
| 2019/0224974 | A1 | 7/2019 | Kihira et al. | |
| 2019/0283421 | A1* | 9/2019 | Miyazawa | B41J 2/14233 |
| 2020/0094595 | A1 | 3/2020 | Masami et al. | |
| 2020/0101731 | A1 | 4/2020 | Hayashi | |
| 2020/0247120 | A1* | 8/2020 | Mizuno | B41J 2/18 |
| 2022/0032622 | A1* | 2/2022 | Kitaoka | B41J 2/14274 |
| 2023/0373212 | A1 | 11/2023 | Iwama et al. | |

FOREIGN PATENT DOCUMENTS

| | | | |
|---|---|---|---|
| CN | 114193928 | A | 3/2022 |
| EP | 3 628 492 | A1 | 4/2020 |
| JP | H06-191030 | A | 7/1994 |
| JP | 2005-125631 | A | 5/2005 |
| JP | 2018-094866 | A | 6/2018 |
| JP | 2019-104152 | A | 6/2019 |

OTHER PUBLICATIONS

Office Action issued Apr. 28, 2026 in Chinese Patent Application No. 202410369353.2, 7 pages.

* cited by examiner

LIQUID DISCHARGE HEAD, LIQUID DISCHARGE UNIT, AND LIQUID DISCHARGE APPARATUS

CROSS-REFERENCE TO RELATED APPLICATION

This patent application is based on and claims priority pursuant to 35 U.S.C. § 119(a) to Japanese Patent Application No. 2023-055281, filed on Mar. 30, 2023, in the Japan Patent Office, the entire disclosure of which is hereby incorporated by reference herein.

BACKGROUND

Technical Field

Embodiments of the present disclosure relate to a liquid discharge head, a liquid discharge unit, and a liquid discharge apparatus.

Related Art

In the related art, a liquid discharge head includes a nozzle plate, a channel substrate, a diaphragm, a piezoelectric element, and a common chamber substrate. In such a liquid discharge head, the pressure of a chamber in the channel substrate is changed by the piezoelectric element, and a liquid is discharged from a nozzle formed in the nozzle plate.

SUMMARY

Embodiments of the present disclosure describe an improved liquid discharge head that includes a nozzle plate, a common chamber substrate, a channel substrate, a first bridge, and a second bridge. The nozzle plate has multiple nozzles from each of which a liquid is dischargeable in a first direction. The common chamber substrate has a supply-side common chamber having a first supply sidewall and a second supply sidewall opposed to the first supply sidewall in a second direction orthogonal to the first direction, and a collection-side common chamber adjacent to the supply-side common chamber in the second direction with one side wall intervening between the supply-side common chamber and the collection-side common chamber. The collection-side common chamber has a first collection sidewall and a second collection sidewall opposed to the first collection sidewall in the second direction. The first supply sidewall and the first collection sidewall form opposite side faces of the one side wall. The channel substrate is laminated over the common chamber substrate in the first direction. The channel substrate has multiple individual chambers each communicating with the supply-side common chamber and the collection-side common chamber. The first bridge is disposed between the first supply sidewall and the second supply sidewall in the second direction to bridge the supply-side common chamber. The second bridge is disposed between the first collection sidewall and the second collection sidewall in the second direction to bridge the collection-side common chamber.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
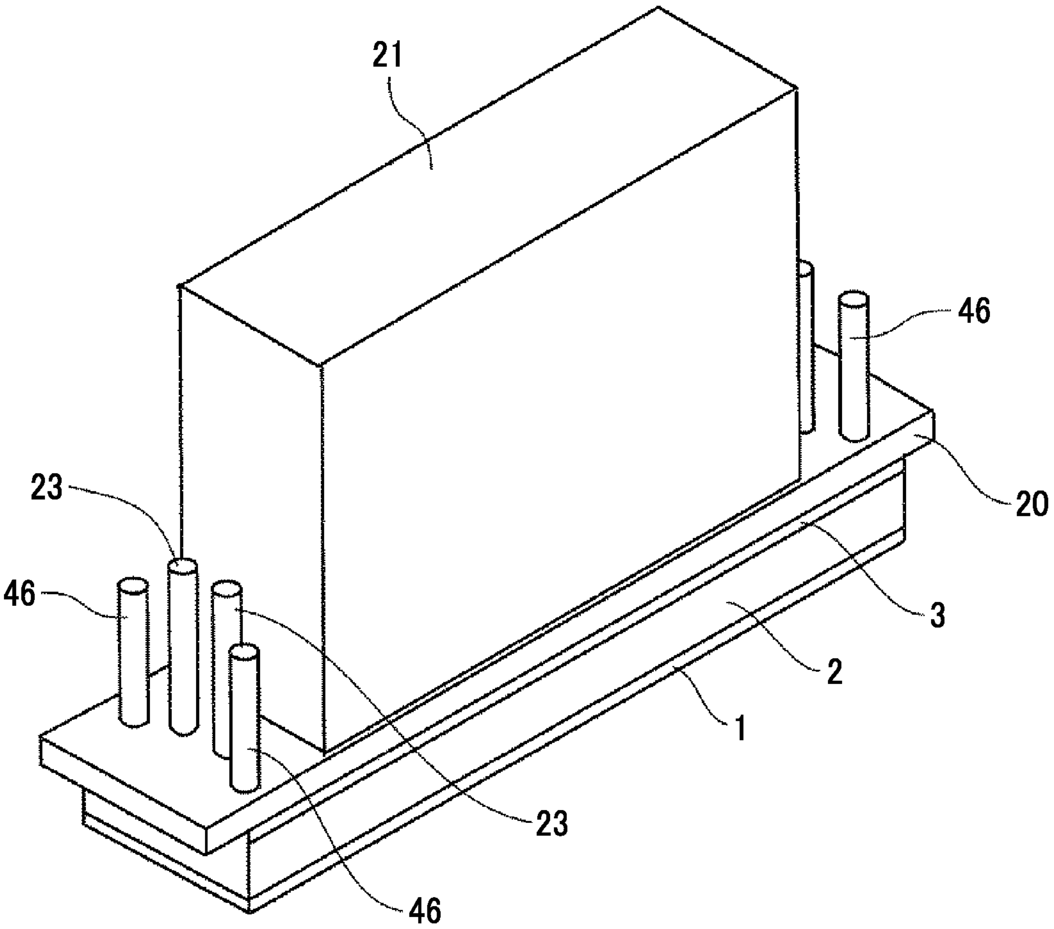
FIG. 1 is a schematic external perspective view of a liquid discharge head according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms “a,” “an,” and “the” are intended to include the plural forms as well, unless the context clearly indicates otherwise.

A liquid discharge head, a liquid discharge unit, and a liquid discharge apparatus according to embodiments of the present disclosure are described below with reference to the drawings. Embodiments of the present disclosure are not limited to the embodiments described below and may be other embodiments than the embodiments described below.

The following embodiments may be modified by, for example, addition, modification, or omission within the scope that would be obvious to one skilled in the art. Any aspects having advantages as described for the following embodiments according to the present disclosure are included within the scope of the present disclosure.

A liquid discharge head includes a common chamber substrate having a supply-side common chamber and a collection-side common chamber, and a channel substrate having multiple individual chambers communicating with the supply-side common chamber and the collection-side common chamber. The common chamber substrate and the channel substrate are laminated one over another. The supply-side common chamber and the collection-side common chamber are arranged side by side on the individual chamber side. Each of the supply-side common chamber and the collection-side common chamber has two sidewalls in a direction in which the supply-side common chamber and the collection-side common chamber are adjacent to each other on the individual chamber side. One sidewall of the supply-side common chamber and one sidewall of the collection-side common chamber are adjacent to each other. The supply-side common chamber includes a first bridge bridging between one sidewall and the other sidewall of the supply-side common chamber and has rigidity. The collection-side common chamber includes a second bridge bridging between one sidewall and the other sidewall of the collection-side common chamber and has rigidity.

Figure 2:
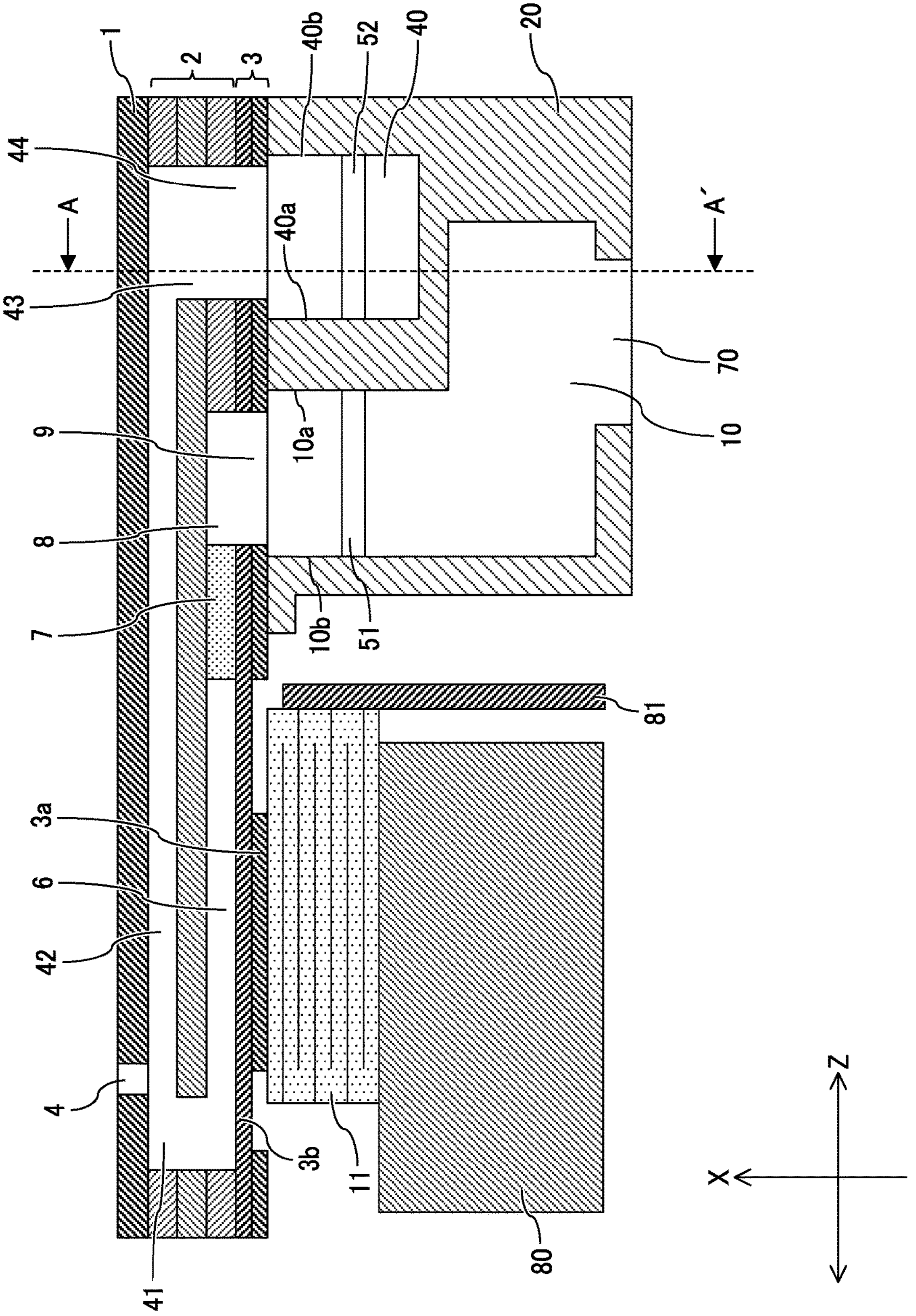
FIG. 2 is a schematic cross-sectional view of a liquid discharge head according to an embodiment of the present disclosure.

FIG. 1 is a schematic external perspective view of a liquid discharge head according to an embodiment of the present disclosure. FIG. 2 is a cross-sectional view of the liquid discharge head of FIG. 1 taken in a direction perpendicular to a nozzle array direction. A liquid discharge direction is downward in FIG. 1, but the liquid discharge direction is upward in FIG. 2. In FIG. 1 and FIG. 2, the liquid discharge direction (i.e., a first direction) is an X-axis direction.

In the present embodiment, a liquid discharge head includes a nozzle plate 1, a channel substrate 2, and a common chamber substrate 20 laminated one over another and bonded to each other. In the liquid discharge head according to the present embodiment, a diaphragm 3 is disposed between the channel substrate 2 and the common chamber substrate 20. The liquid discharge head according to the present embodiment includes a piezoelectric element 11 to displace the diaphragm 3.

The common chamber substrate 20 has a common chamber. The liquid discharge head according to the present embodiment is a circulation type liquid discharge head. The common chamber includes a supply-side common chamber 10 for supplying liquid to individual chambers, and a collection-side common chamber 40 for collecting the liquid from the individual chambers. The common chamber substrate 20 may be referred to as, for example, a frame substrate. The common chamber substrate 20, the channel substrate 2, and the nozzle plate 1 are laminated one over another.

As illustrated in FIG. 2, the supply-side common chamber 10 and the collection-side common chamber 40 are arranged side by side on the individual chamber side. The individual chamber side may be referred to as the channel substrate 2 side. The direction in which the supply-side common chamber 10 and the collection-side common chamber 40 are adjacent to each other on the individual chamber side is a Z-axis direction in FIG. 2.

The direction in which the supply-side common chamber 10 and the collection-side common chamber 40 are adjacent to each other on the individual chamber side may be referred to as an adjacent direction (i.e., a second direction) in the following description.

As illustrated in FIG. 1, supply ports 23 communicating with the supply-side common chamber 10 and collection ports 46 communicating with the collection-side common chamber 40 are disposed outside a cover 21 and the common chamber substrate 20.

The nozzle plate 1 has multiple nozzles 4 from which liquid is discharged. The nozzle plate may be referred to as, for example, a nozzle substrate or a nozzle member in the following description. The nozzle plate 1 has the multiple nozzles 4 corresponding to the individual chambers, respectively.

The channel substrate 2 has a pressure generation chamber 6 communicating with the nozzle 4, a supply-side fluid restrictor 7 communicating with the pressure generation chamber 6, and a liquid introduction portion 8 communicating with the supply-side fluid restrictor 7. In the present embodiment, the liquid introduction portion 8 is partitioned among the pressure generation chambers 6. The liquid introduction portion 8 is not limited thereto, and separate liquid introduction portions may be provided for the pressure generation chambers 6, respectively. In such a case, multiple liquid introduction portions 8 are formed for one common chamber.

The liquid discharge head according to the present embodiment is a circulation type. The channel substrate 2 has a collection channel 42 communicating with the pressure generation chamber 6 and a drain portion 43 communicating with the collection channel 42. A collection-side fluid restrictor may be disposed in the collection channel 42. The supply-side fluid restrictor 7, the liquid introduction portion 8, the collection-side fluid restrictor, the collection channel 42, and the drain portion 43 can be formed by, for example, through holes and grooves.

The channel substrate 2 has multiple individual chambers communicating with the common chamber.

In the present embodiment, each of the multiple individual chambers is, for example, a portion of the liquid introduction portion 8, the pressure generation chamber 6, a communication port 41, the collection channel 42, and the drain portion 43. The individual chamber may include the supply-side fluid restrictor 7. Further, the individual chamber may include the collection-side fluid restrictor. The pressure generation chamber 6 may be referred to as, for example, a pressurization chamber. The individual chamber may be referred to simply as a chamber.

The diaphragm 3 defines a wall face of the pressure generation chamber 6. The diaphragm 3 may have, for example, a two-layer structure. The two-layer structure may include, for example, a first layer forming a thin portion and a second layer forming a thick portion from the channel substrate 2 side.

The diaphragm 3 has a vibration region 3*b* which may be referred to as, for example, a diaphragm portion. For example, the first layer forms the vibration region 3*b*. The vibration region 3*b* is a deformable region disposed at a position corresponding to the pressure generation chamber 6. A projection 3*a* as the thick portion is disposed at a position corresponding to the piezoelectric element 11. For example, the second layer forms the projection 3*a*.

The channel substrate 2 may include the diaphragm 3, or the channel substrate 2 may not include the diaphragm 3.

The piezoelectric element 11 is disposed on the opposite side of the diaphragm 3 with respect to the pressure generation chamber 6. The piezoelectric element 11 is a driver, which may be referred to as, for example, an actuator or a pressure generator, to deform the vibration region 3*b* of the diaphragm 3.

The piezoelectric element 11 is bonded onto, for example, a base 80. The piezoelectric element 11 includes piezoelectric layers and internal electrodes that are alternately laminated. The internal electrodes are led out to end faces of the piezoelectric element 11 to form external electrodes. The piezoelectric element 11 is connected to a flexible printed circuit (FPC) 81. The piezoelectric element 11 is driven as a drive waveform is applied to the piezoelectric element 11.

In the liquid discharge head according to the present embodiment, for example, as a voltage applied to the piezoelectric element 11 is lowered below a reference potential, the piezoelectric element 11 contracts. As a result, the portion of the diaphragm 3 corresponding to the piezoelectric element 11 is deformed in a direction away from the nozzle 4, and the volume of the pressure generation chamber 6 increases. As a result, liquid flows into the pressure generation chamber 6.

Subsequently, as the voltage applied to the piezoelectric element 11 is raised, the piezoelectric element 11 expands in a lamination direction (i.e., the first direction). As a result, the diaphragm 3 is deformed in a direction toward the nozzle 4, and the volume of the pressure generation chamber 6 decreases. Thus, liquid in the pressure generation chamber 6 is pressurized and discharged from the nozzle 4.

As the voltage applied to the piezoelectric element 11 is returned to the reference potential, the diaphragm 3 is returned to the initial position. Accordingly, the pressure generation chamber 6 expands to generate a negative pressure, and the pressure generation chamber 6 is filled with liquid from the supply-side common chamber 10. After the vibration of the meniscus surface of the liquid in the nozzle 4 is attenuated and stabilized, the liquid discharge head shifts to an operation for the next liquid discharge.

The method of driving the liquid discharge head is not limited to the above-described example (pull-push discharge). For example, pull discharge or push discharge may be performed in accordance with the way to apply a drive waveform.

The flow of liquid (e.g., ink) according to the present embodiment is described below.

The ink is supplied from an ink supply port 70 to the supply-side common chamber 10, passes through a supply-side opening 9 of the diaphragm 3, and flows into the channel substrate 2. The ink passes through the liquid introduction portion 8 and then through the supply-side fluid restrictor 7. Then, the ink is pressurized in the pressure generation chamber 6 and discharged from the nozzle 4 through the communication port 41. The ink, which has not been discharged from the nozzle 4, passes through the collection channel 42 and the drain portion 43 and flows into the collection-side common chamber 40 through a collection-side opening 44 of the diaphragm 3. The ink that has flowed into the collection-side common chamber 40 is drained from an ink drain port 71, which is described later.

Figure 3:
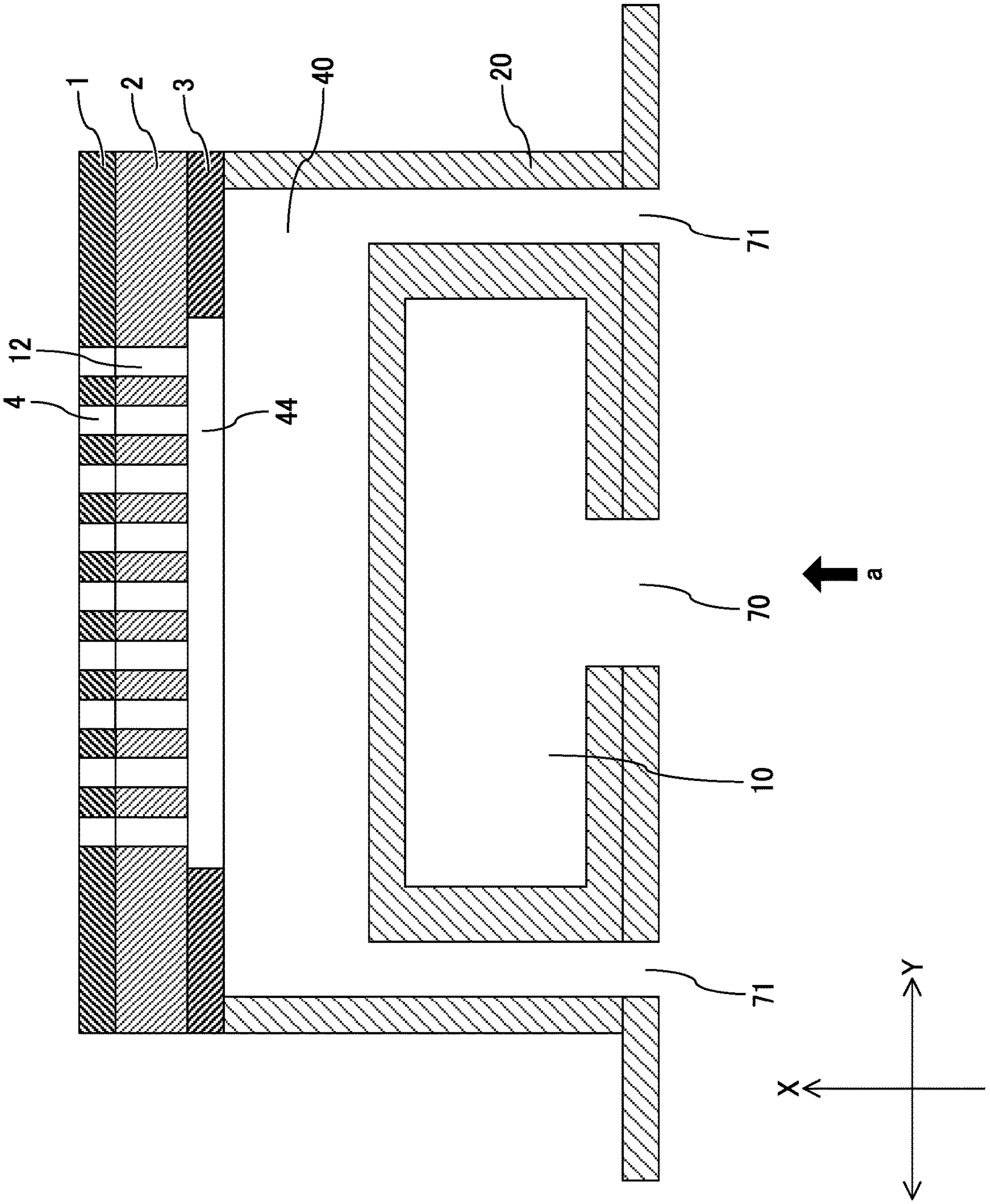
FIG. 3 is a cross-sectional view of the liquid discharge head of FIG. 2 taken along line A-A' in FIG. 2.

FIG. 3 is a cross-sectional view of the liquid discharge head of FIG. 2 taken along line A-A' in FIG. 2. In FIG. 3, individual chambers 12 are schematically illustrated. In addition, the illustrations of the channel substrate 2 and the diaphragm 3 are simplified in FIG. 3. In FIG. 3, a direction in which the nozzles 4 are arrayed (nozzle array direction) is a Y-axis direction (i.e., a third direction).

The ink flows from the individual chambers 12 to the collection-side common chamber 40 through the collection-side opening 44 of the diaphragm 3. The ink that has flowed into the collection-side common chamber 40 is drained from the ink drain port 71. On the supply side, the ink flows from the supply-side common chamber 10 to the individual chambers 12 in a cross section different from that of FIG. 3. The ink is supplied from the ink supply port 70 to the supply-side common chamber 10.

Figure 4:
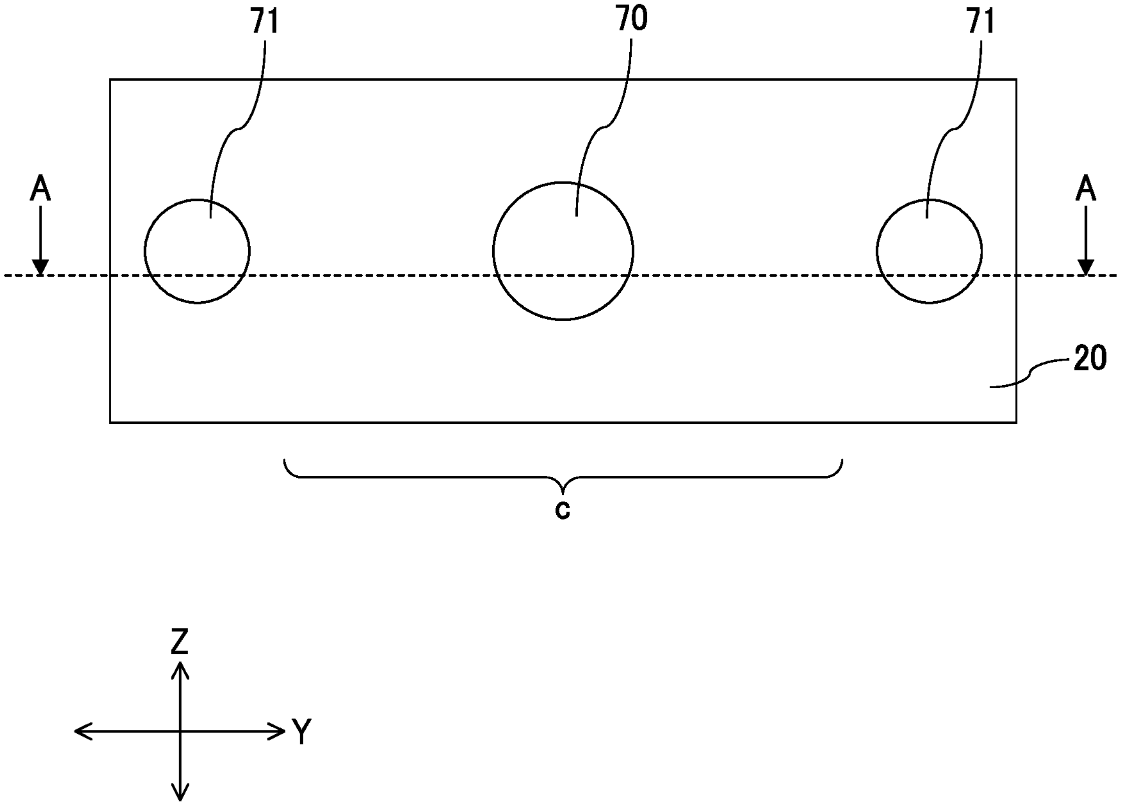
FIG. 4 is a schematic plan view of the liquid discharge head of FIG. 3 as viewed in the direction indicated by arrow a in FIG. 3.

FIG. 4 is a schematic plan view of the liquid discharge head of FIG. 3 as viewed in the direction indicated by arrow a in FIG. 3. FIG. 4 illustrates the ink supply port 70 and the ink drain ports 71 according to the present embodiment. However, for example, the shape and arrangement of the ink supply port 70 and the ink drain ports 71 are not limited thereto, and can be appropriately changed. FIG. 3 is the schematic cross-sectional view of the liquid discharge head taken along line A-A in FIG. 4 corresponding to line A-A' in FIG. 2.

A comparative example is described below.

In a liquid discharge head according to the comparative example, when liquid is discharged from nozzles, a frame substrate having a common chamber vibrates, and such a vibration causes a difference in meniscus vibration among the nozzles. When the meniscus vibration is different among the nozzles, the liquid discharge varies among the nozzles, and stable discharge properties may not be obtained. If the stable discharge properties are not obtained, for example, image quality may deteriorate.

By contrast, in the liquid discharge head according to the present embodiment, a bridge for preventing the deformation of the common chamber substrate 20 is disposed in each of the supply-side common chamber 10 and the collection-side common chamber 40. The bridge having rigidity can prevent the deformation of the common chamber substrate 20. Accordingly, the vibration due to the deformation of the common chamber substrate 20, which occurs when liquid is discharged from the nozzles, can be prevented, and thus the difference in meniscus vibration among the nozzles can be prevented. As a result, the discharge properties of liquid can be stabilized.

In the present embodiment, in order to reduce the vibration of the common chamber substrate 20, the liquid discharge head includes a bridge bridging between the sidewalls of the supply-side common chamber 10 and a bridge bridging between the sidewalls of the collection-side common chamber 40, and the bridges have rigidity.

The bridge has a shape that does not reduce the cross-sectional area of channel in the flowing direction of liquid in the common chamber and can minimize pressure loss.

According to the present embodiment, the meniscus vibration due to the vibration of the common chamber substrate 20 propagating to the nozzle plate 1 can be prevented. As a result, stable discharge properties can be obtained.

In the liquid discharge head according to the present embodiment, the supply-side common chamber 10 and the collection-side common chamber 40 are arranged side by side on the individual chamber side. Each of the supply-side common chamber 10 and the collection-side common chamber 40 has two sidewalls in a direction in which the supply-side common chamber 10 and the collection-side common chamber 40 are adjacent to each other on the individual chamber side. One sidewall (i.e., a first sidewall **10*a* as a first supply sidewall) of the supply-side common chamber 10 and one sidewall (i.e., a first sidewall 40*a* as a first collection sidewall) of the collection-side common chamber 40 are adjacent to each other. The supply-side common chamber 10 includes a first bridge 51 bridging between the first sidewall 10*a* and the other sidewall (i.e., a second sidewall 10*b* as a second supply sidewall) of the supply-side common chamber 10 and having rigidity. The collection-side common chamber 40 includes a second bridge 52 bridging between the first sidewall 40***a* and the other sidewall (i.e., a second sidewall 40*b* as a second collection sidewall) of the collection-side common chamber 40 and having rigidity.

As illustrated in FIG. 2, the supply-side common chamber 10 and the collection-side common chamber 40 each have two sidewalls (the first sidewall 10*a* and the second sidewall 10*b* or the first sidewall 40*a* and the second sidewall 40*b*) in the direction in which the supply-side common chamber 10 and the collection-side common chamber 40 are adjacent to each other (i.e., the adjacent direction) on the individual chamber side, and the first sidewall 10*a* of the supply-side common chamber 10 and the first sidewall 40*a* of the collection-side common chamber 40 are adjacent to each other.

As described above, the direction in which the supply-side common chamber 10 and the collection-side common chamber 40 are adjacent to each other on the individual chamber side may be referred to as the adjacent direction. The adjacent direction is the Z-axis direction in FIG. 2 (i.e., the second direction).

As illustrated in FIG. 2, the supply-side common chamber 10 is provided with the first bridge 51 bridging between the first sidewall 10*a* and the second sidewall 10*b* of the supply-side common chamber 10. The collection-side common chamber 40 is provided with the second bridge 52 bridging between the first sidewall 40*a* and the second sidewall 40*b* of the collection-side common chamber 40.

The first bridge 51 and the second bridge 52 have rigidity, and thus may be referred to as, for example, a first rigid bridge and a second rigid bridge. The rigidity of the first bridge 51 and the second bridge 52 is determined so as to reduce the deformation of the common chamber substrate 20 and the vibration of the common chamber substrate 20 due to the deformation.

The first bridge 51 and the second bridge 52 preferably have high rigidity. The first bridge 51 and the second bridge 52 having the high rigidity can further reduce the vibration due to the deformation of the common chamber substrate 20. In addition, the first bridge 51 and the second bridge 52 having the high rigidity can reduce the size of the first bridge 51 and the second bridge 52. The first bridge 51 and the second bridge 52 having such a small size do not hinder the flow of ink.

As illustrated in FIG. 2, the first bridge 51 and the second bridge 52 are opposed to each other via the first sidewall 10*a* of the supply-side common chamber 10 and the first sidewall 40*a* of the collection-side common chamber 40. Such an arrangement can reliably reduce the vibration and deformation of the common chamber substrate 20. A pair of the first bridge 51 and the second bridge 52 opposed to each other may be referred to as, for example, a pair of bridges.

Figure 5:
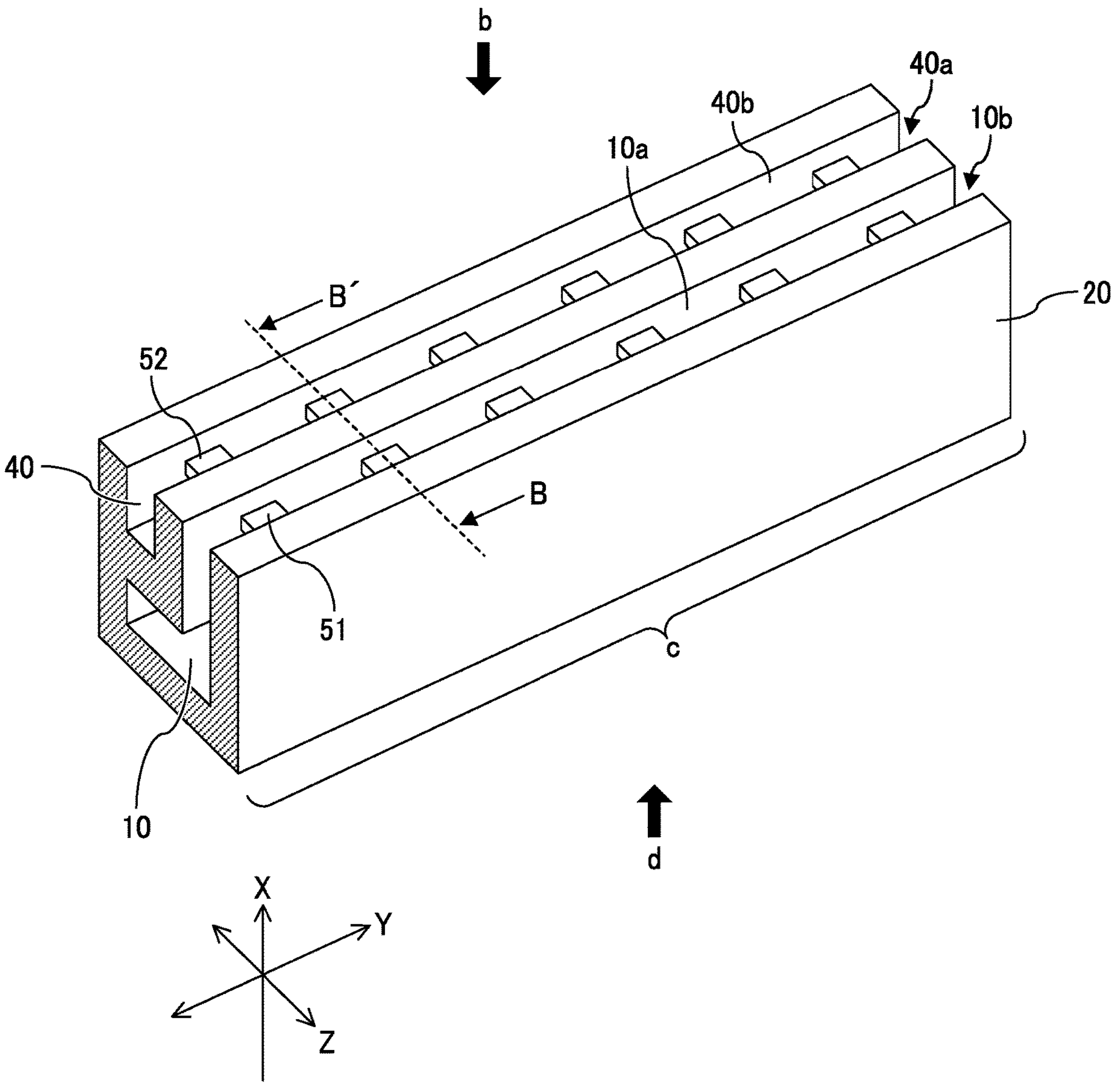
FIG. 5 is a schematic perspective view of a part of a common chamber substrate according to an embodiment of the present disclosure.

FIG. 5 is a schematic perspective view of the common chamber substrate 20 according to the present embodiment, illustrating the first bridge 51 and the second bridge 52. In FIG. 5, the X-axis direction is the liquid discharge direction, the Y-axis direction is the arrangement direction of the nozzles 4 (i.e., the nozzle array direction), and the Z-axis direction is the direction in which the supply-side common chamber 10 and the collection-side common chamber 40 are adjacent to each other on the individual chamber side (i.e., the adjacent direction). FIG. 4 is the schematic plan view of the liquid discharge head as viewed in the direction indicated by arrow d in FIG. 5, and a portion c in FIG. 5 corresponds to the portion c in FIG. 4.

As illustrated in FIG. 5, multiple first bridges 51 and multiple second bridges 52 are provided. The multiple first bridges 51 and the multiple second bridges 52 can reliably reduce the vibration and deformation of the common chamber substrate 20.

As in the present embodiment, multiple pairs of bridges are preferably disposed in the direction of the sidewall of the common chamber. Such a preferable configuration is defined as follows.

In the present embodiment, the sidewalls (the first sidewall 10*a*, the second sidewall 10*b*, the first sidewall 40*a*, and the second sidewall 40*b*) of the supply-side common chamber 10 and the collection-side common chamber 40 are formed in the same direction (e.g., spread in the X-axis direction and the Y-axis direction), and multiple pairs of the first bridge 51 and the second bridge 52 (multiple pairs of bridges) opposed to each other are arranged in the direction of the sidewalls. In this case, the vibration and deformation of the common chamber substrate 20 can be further reduced. Accordingly, the discharge properties can be further enhanced. The direction of the sidewalls is the Y-axis direction in the drawings (i.e., the third direction).

Figure 6:
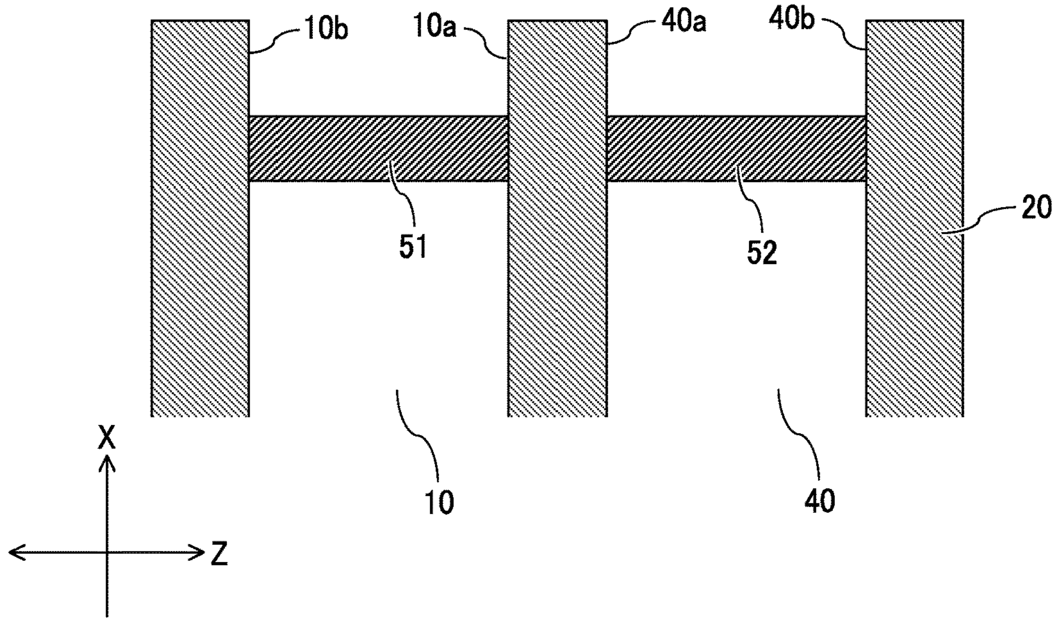
FIG. 6 is a cross-sectional view of the part of the common chamber substrate of FIG. 5 taken along line B-B' in FIG. 5.

FIG. 6 is a schematic cross-sectional view of a part of the common chamber substrate 20, illustrating a pair of the first bridge 51 and the second bridge 52 (one pair of bridges) opposed to each other. FIG. 6 corresponds to a cross section taken along line B-B' in FIG. 5, illustrating the part of the common chamber substrate 20 on the individual chamber side. As illustrated in FIG. 6, the first bridge 51 and the second bridge 52 are opposed to each other via the first sidewall 10*a* of the supply-side common chamber 10 and the first sidewall 40*a* of the collection-side common chamber 40.

Figure 7:
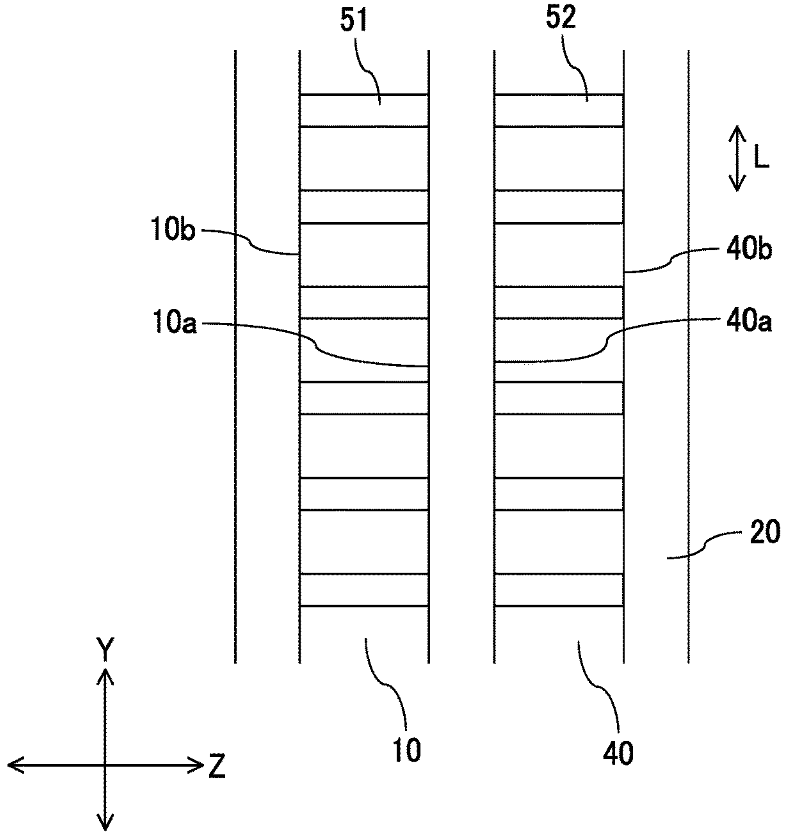
FIG. 7 is a schematic plan view of the part of the common chamber substrate of FIG. 5 as viewed in the direction indicated by arrow b in FIG. 5.

FIG. 7 is a schematic view of the part of the common chamber substrate as viewed in the direction indicated by arrow b in FIG. 5. In other words, FIG. 7 is a schematic view of the part of the common chamber substrate as viewed from the upper side of the illustration on the paper on which FIG. 5 is drawn. As illustrated in FIG. 7, multiple pairs of the first bridge 51 and the second bridge 52 (multiple pairs of bridges) each opposed to each other are arranged in the direction of the sidewalls (Y-axis direction).

In FIGS. 5 to 7, for example, the multiple pairs of bridges are arranged at equal intervals. Embodiments of the present disclosure are not limited thereto, and an interval L of the multiple pairs of bridges may be changed.

Figure 8:
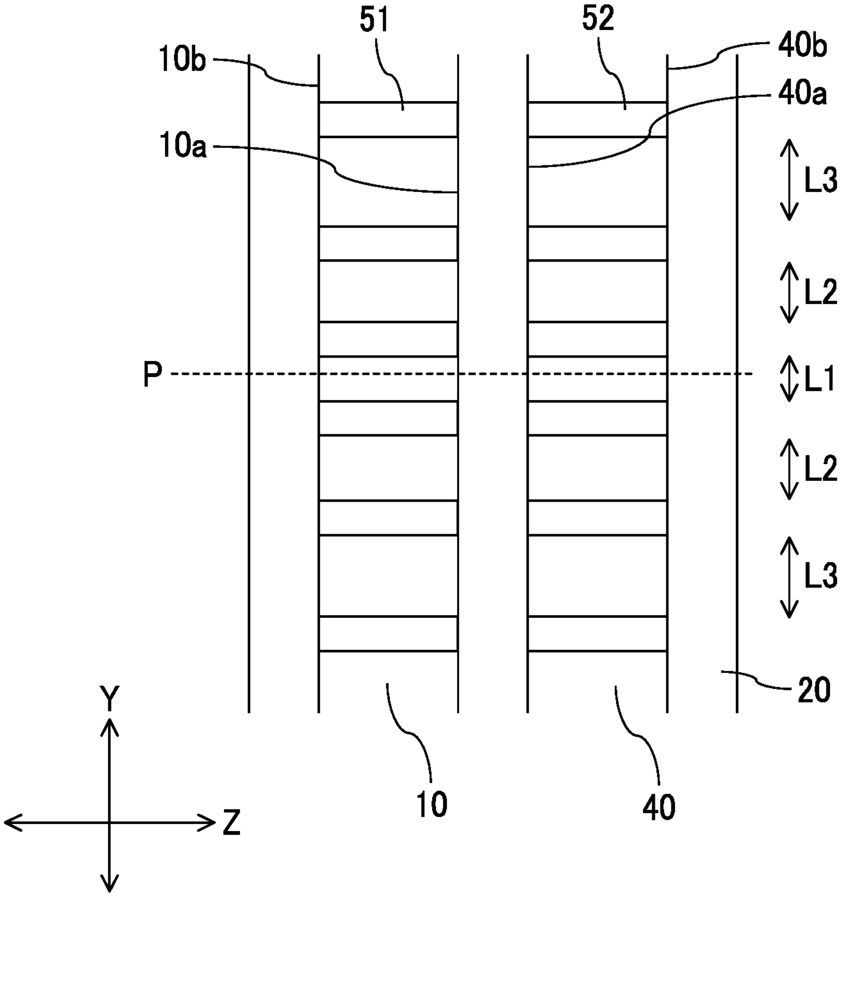
FIG. 8 is a schematic plan view of a part of a common chamber substrate according to a modification of the embodiment of FIG. 7.

Similarly to FIG. 7, FIG. 8 is a schematic plan view of a part of a common chamber substrate according to a modification of the embodiment of FIG. 7. In this modification, the interval between the adjacent pairs of the first bridge 51 and the second bridge 52 (two pairs of bridges) becomes narrower toward the center in the direction of the sidewalls. As illustrated in FIG. 8, the interval L between the adjacent pairs of bridges decreases toward a center P of the sidewalls in the direction of the sidewalls (Y-axis direction). In other words, intervals L1, L2, and L3 increase in this order (i.e., L1<L2<L3).

Stresses are likely to concentrate on the central portions of the sidewalls (the first sidewall 10*a*, the second sidewall 10*b*, the first sidewall 40*a*, and the second sidewall 40*b*) of the supply-side common chamber 10 and the collection-side common chamber 40. Accordingly, the interval between the adjacent pairs of bridges decreasing toward the central portion as in the present embodiment can further reduce the deformation of the common chamber substrate 20.

The first bridge 51 and the second bridge 52 preferably have a shape and a size that do not hinder the flow of ink. The first bridge 51 and the second bridge 52 are preferably small in size so as not to hinder the flow of ink. However, if the size is too small, the rigidity of the bridges does not sufficiently prevent the deformation of the common chamber substrate 20. In the present embodiment, for example, the first bridges 51 and the second bridges 52 have an area ratio to the supply-side common chamber 10 and the collection-side common chamber 40 sufficient to prevent the deformation of the common chamber substrate 20 as viewed from the channel substrate side.

The arrangement of the first bridge 51 and the second bridge 52 can be changed as appropriate. For example, the first bridge 51 and the second bridge 52 are preferably disposed at a position close to the individual chamber, i.e., a position close to the channel substrate 2.

For example, such a preferable configuration is defined as follows.

The direction in which the common chamber substrate 20 and the channel substrate 2 are laminated one over another is defined as the lamination direction (i.e., the first direction), and the lamination direction is referred to as the thickness direction of the common chamber substrate 20. The first bridge 51 and the second bridge 52 are preferably disposed closer to the channel substrate 2 than the midpoint of the thickness of the common chamber substrate 20.

In this case, the first bridge 51 and the second bridge 52 are disposed at positions close to the channel substrate 2. As a result, the vibration of the common chamber substrate 20, which occurs when liquid is discharged from the nozzles 4, can be reliably reduced.

Figure 9:
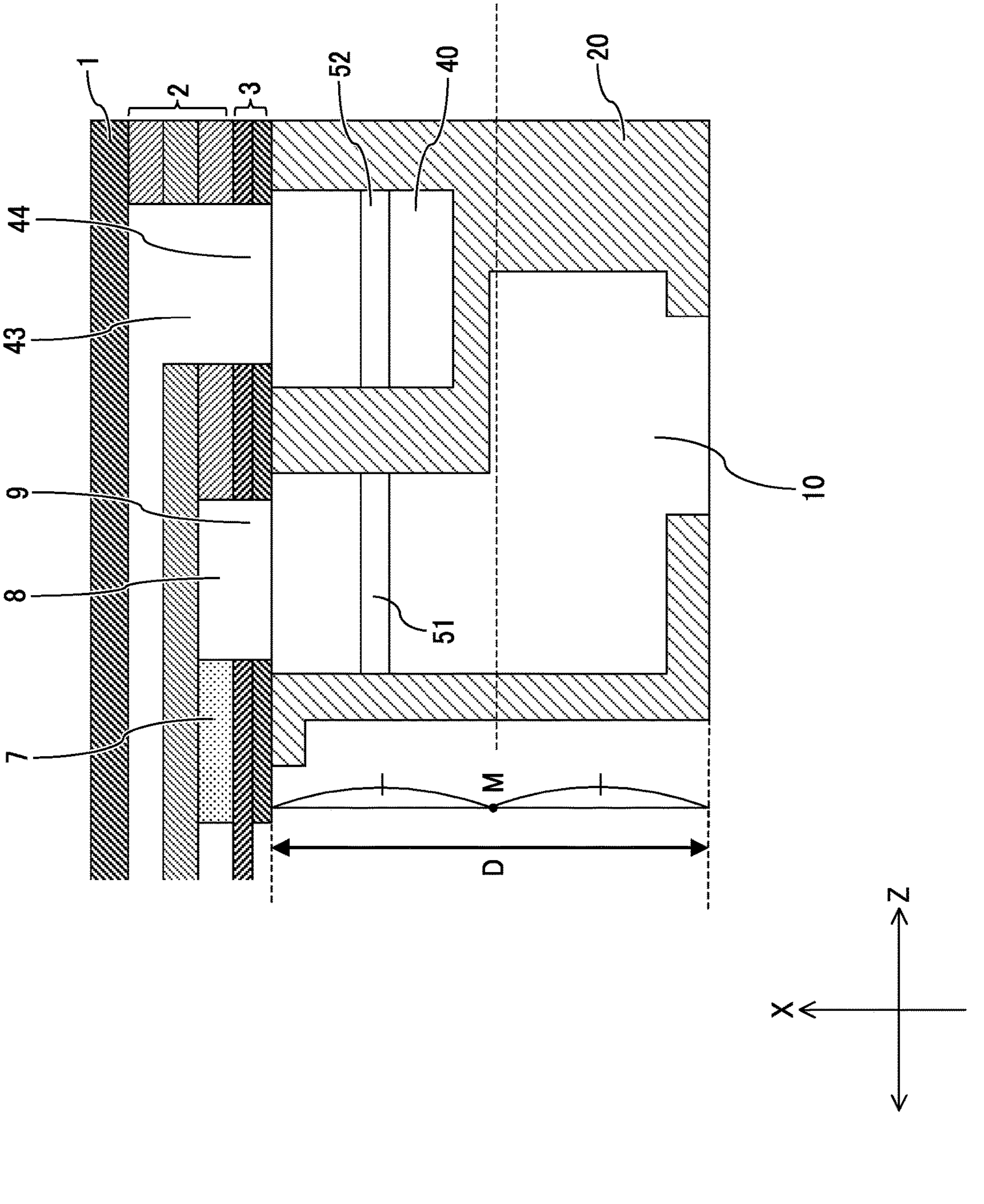
FIG. 9 is a schematic cross-sectional view of a part of the liquid discharge head of FIG. 2.

Such a configuration is described below with reference to FIG. 9. FIG. 9 is a schematic cross-sectional view of a part of the liquid discharge head of FIG. 2. In FIG. 9, the lamination direction of the common chamber substrate 20 and the channel substrate 2 is the X-axis direction, and the thickness direction of the common chamber substrate 20 is also the X-axis direction (i.e., the first direction). The common chamber substrate 20 has a thickness D and a midpoint M of the thickness D. As illustrated in FIG. 9, the first bridge 51 and the second bridge 52 are disposed closer to the channel substrate 2 than the midpoint M of the thickness D of the common chamber substrate 20 is disposed. Accordingly, the vibration of the common chamber substrate 20 can be reliably reduced.

The method of forming the bridge is not limited to a particular method and can be appropriately selected. For example, the bridge is formed by etching.

Preferably, the common chamber substrate 20, the first bridge 51, and the second bridge 52 are formed of the same material, and the first bridge 51 and the second bridge 52 are formed integrally with the common chamber substrate 20. Such a configuration can reliably reduce the vibration of the common chamber substrate 20.

Figure 10:
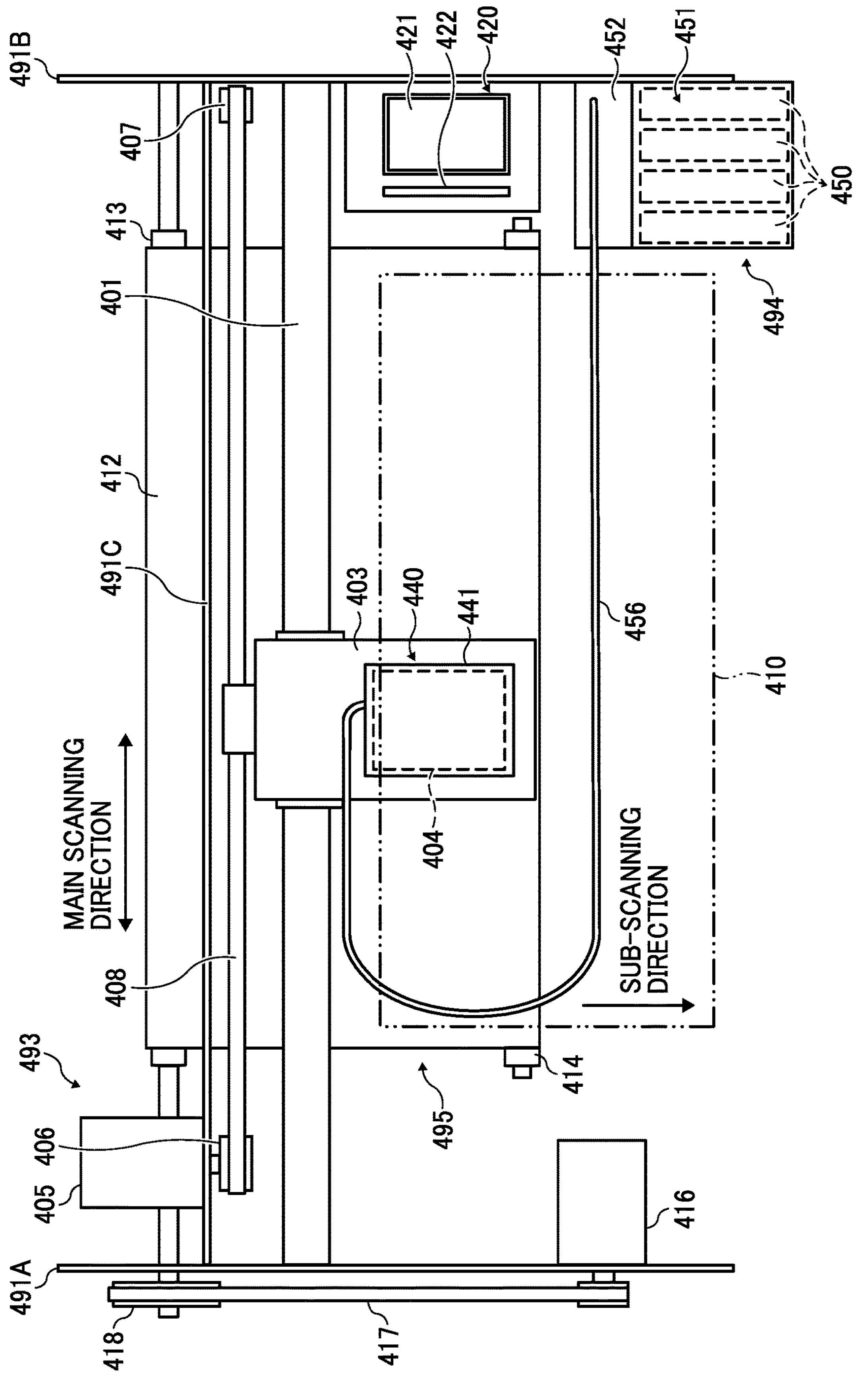
FIG. 10 is a schematic plan view of a liquid discharge apparatus according to an embodiment of the present disclosure.
Figure 11:
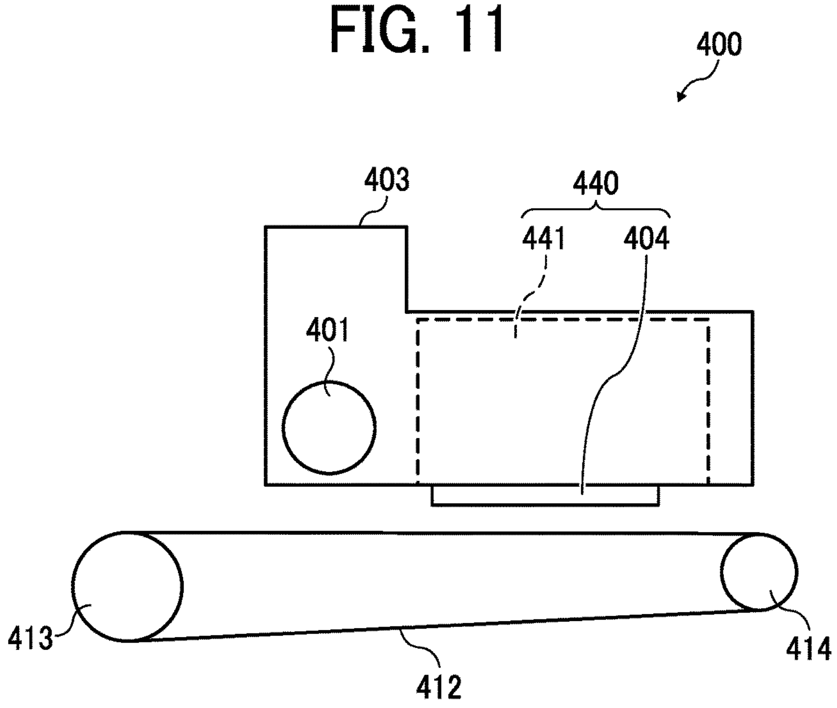
FIG. 11 is a schematic side view of the liquid discharge apparatus of FIG. 10.

A liquid discharge apparatus 400 according to an embodiment of the present disclosure is described below with reference to FIGS. 10 and 11. FIG. 10 is a plan view of a part of the liquid discharge apparatus 400. FIG. 11 is a side view of the part of the liquid discharge apparatus 400 of FIG. 10.

The liquid discharge apparatus 400 according to the present embodiment is a serial-type apparatus in which a main-scanning moving mechanism 493 reciprocates a carriage 403 in a main scanning direction. The main-scanning moving mechanism 493 includes, for example, a guide 401, a main-scanning motor 405, and a timing belt 408. The guide 401 is bridged between left and right side plates 491A and 491B to movably hold the carriage 403. The main-scanning motor 405 reciprocates the carriage 403 in the main scanning direction via the timing belt 408 looped around a drive pulley 406 and a driven pulley 407.

The carriage 403 includes a liquid discharge unit 440 in which a liquid discharge head 404 (e.g., the liquid discharge head described above) and a head tank 441 are integrated into a single unit. The liquid discharge unit 440 may include multiple liquid discharge heads including the liquid discharge head described above. The liquid discharge head 404 of the liquid discharge unit 440 discharges color liquids of, for example, yellow (Y), cyan (C), magenta (M), and black (K). The liquid discharge head 404 is mounted on the liquid discharge unit 440 of the carriage 403 such that a row of the multiple nozzles 4 is arrayed in the sub-scanning direction perpendicular to the main scanning direction. The liquid discharge head 404 discharges the color liquid downward. For example, the above-described liquid discharge head can be used as the liquid discharge head 404.

A supply mechanism 494 disposed outside the liquid discharge head 404 supplies liquid stored in liquid cartridges 450 to the head tank 441 to supply the liquid to the liquid discharge head 404.

The supply mechanism 494 includes a cartridge holder 451 which is a filling part to mount the liquid cartridges 450, a tube 456, and a liquid feed unit 452 including a liquid feed pump. The liquid cartridge 450 is detachably mounted on the cartridge holder 451. The liquid feed unit 452 feeds the liquid from the liquid cartridge 450 to the head tank 441 via the tube 456.

The liquid discharge apparatus 400 further includes a conveyance mechanism 495 to convey a sheet 410. The conveyance mechanism 495 includes a conveyance belt 412 as a conveyor and a sub-scanning motor 416 to drive the conveyance belt 412. The conveyance belt 412 attracts the sheet 410 and conveys the sheet 410 to a position facing the liquid discharge head 404. The conveyance belt 412 is an endless belt looped around a conveyance roller 413 and a tension roller 414. The sheet 410 can be attracted to the conveyance belt 412 by, for example, electrostatic attraction or air suction. The conveyance belt 412 circumferentially moves in the sub-scanning direction as the conveyance roller 413 is rotationally driven by the sub-scanning motor 416 via a timing belt 417 and a timing pulley 418.

On one end of the range of movement of the carriage 403 in the main scanning direction, a maintenance mechanism 420 that maintains and recovers the liquid discharge head 404 is disposed lateral to the conveyance belt 412. The maintenance mechanism 420 includes, for example, a cap 421 to cap the nozzle face (i.e., the surface on which the nozzles 4 are formed) of the liquid discharge head 404 and a wiper 422 to wipe the nozzle face.

The main-scanning moving mechanism 493, the supply mechanism 494, the maintenance mechanism 420, and the conveyance mechanism 495 are mounted onto a housing including the side plates 491A and 491B and a back plate 491C.

In the liquid discharge apparatus 400 having the above-described configuration, the sheet 410 is fed and attracted onto the conveyance belt 412 and conveyed in the sub-scanning direction as the conveyance belt 412 circumferentially moves. The liquid discharge head 404 is driven in response to an image signal while the carriage 403 moves in the main scanning direction to discharge liquid onto the sheet 410 not in motion. As a result, an image is formed on the sheet 410.

As described above, the liquid discharge apparatus 400 includes the liquid discharge head 404 according to the above-described embodiments of the present disclosure, thus allowing the stable formation of high-quality images.

Figure 12:
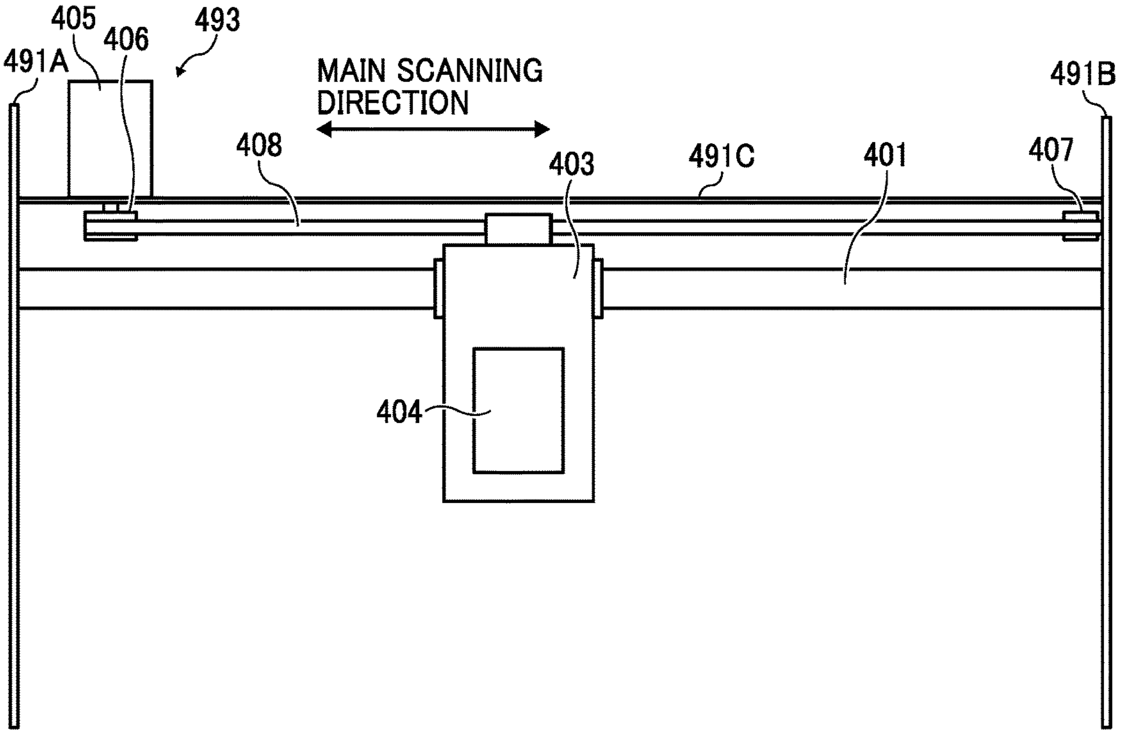
FIG. 12 is a schematic plan view of a liquid discharge unit according to an embodiment of the present disclosure.

Another liquid discharge unit according to an embodiment of the present disclosure is described below with reference to FIG. 12. FIG. 12 is a plan view of a part of the liquid discharge unit according to the present embodiment. The liquid discharge unit includes the housing, the main-scanning moving mechanism 493, the carriage 403, and the liquid discharge head 404 among the components of the liquid discharge apparatus 400 described above. The side plates 491A and 491B, and the back plate 491C construct the housing. The liquid discharge unit may further include at least one of the maintenance mechanism 420 or the supply mechanism 494, which may be attached to the side plate 491B.

Figure 13:
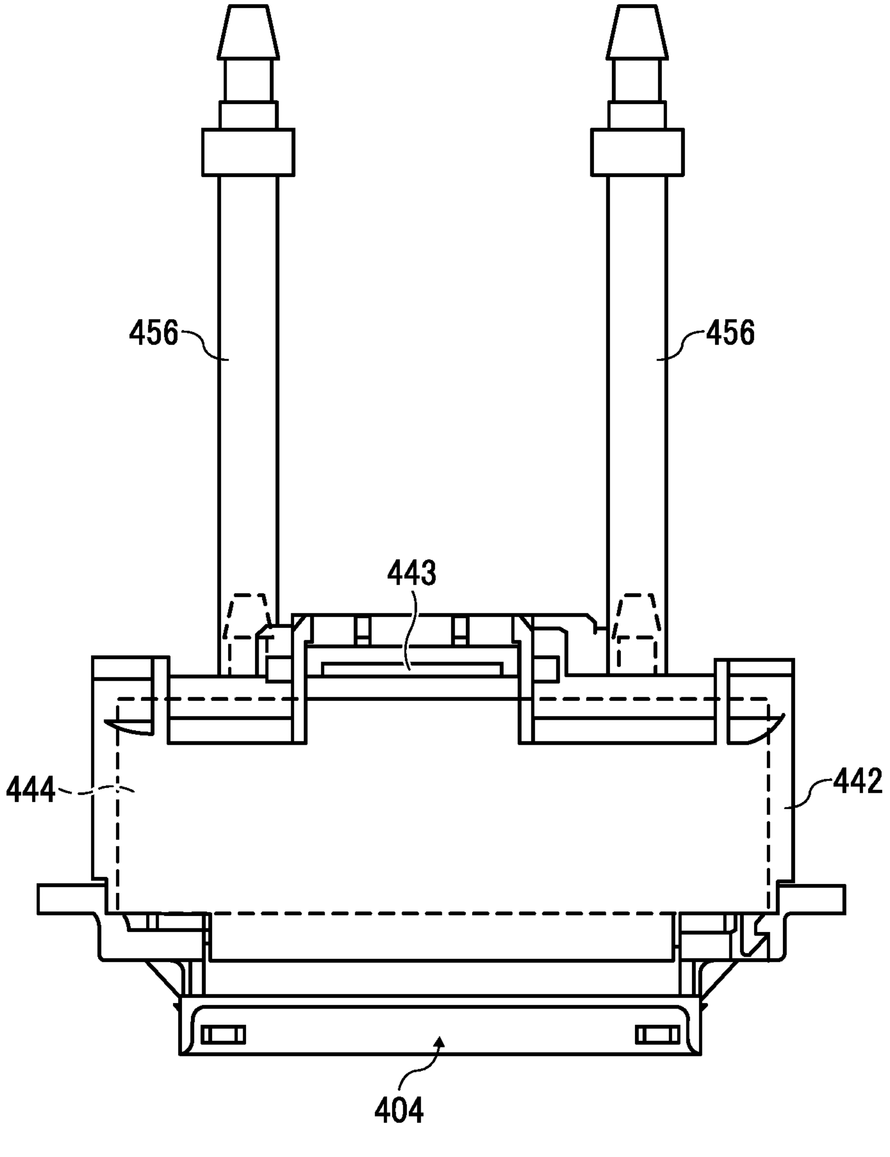
FIG. 13 is a schematic view of another liquid discharge unit according to an embodiment of the present disclosure.

Still another liquid discharge unit according to an embodiment of the present disclosure is described below with reference to FIG. 13. FIG. 13 is a front view of the liquid discharge unit according to the present embodiment. The liquid discharge unit according to the present embodiment includes the liquid discharge head 404 to which a channel component 444 is attached, and tubes 456 connected to the channel component 444. The channel component 444 is disposed inside a cover 442. Alternatively, the liquid discharge unit 440 may include the head tank 441 instead of the channel component 444. A connector 443 for electrically connecting to the liquid discharge head 404 is disposed on an upper portion of the channel component 444.

In the above-described embodiments, the "liquid discharge apparatus" includes the liquid discharge head or the liquid discharge unit and drives the liquid discharge head to discharge liquid. The liquid discharge apparatus may be, for example, any apparatus that can discharge liquid to a medium onto which liquid can adhere or any apparatus to discharge liquid toward gas or into liquid.

The "liquid discharge apparatus" may further include devices relating to feeding, conveying, and ejecting of the medium onto which liquid can adhere and also include a pretreatment device and an aftertreatment device.

The "liquid discharge apparatus" may be, for example, an image forming apparatus to form an image on a sheet by discharging ink, or a three-dimensional fabrication apparatus to discharge fabrication liquid to a powder layer in which powder material is formed in layers, so as to form a three-dimensional object.

The "liquid discharge apparatus" is not limited to an apparatus that discharges liquid to visualize meaningful images such as letters or figures. For example, the liquid discharge apparatus may be an apparatus that forms patterns having no meaning or an apparatus that fabricates three-dimensional images.

The above-described term "medium onto which liquid can adhere" represents a medium on which liquid is at least temporarily adhered, a medium on which liquid is adhered and fixed, or a medium into which liquid adheres and permeates. Specific examples of the "medium onto which liquid can adhere" include, but are not limited to, a recording medium such as a paper sheet, recording paper, a recording sheet of paper, a film, or cloth, an electronic component such as an electronic substrate or a piezoelectric element, and a medium such as layered powder, an organ model, or a testing cell. The "medium onto which liquid can adhere" includes any medium to which liquid adheres, unless otherwise specified.

Examples of materials of the "medium onto which liquid can adhere" include any materials to which liquid can adhere even temporarily, such as paper, thread, fiber, fabric, leather, metal, plastic, glass, wood, ceramic, construction materials (e.g., wallpaper or floor material), and cloth textile.

Examples of the "liquid" include ink, treatment liquid, deoxyribonucleic acid (DNA) sample, resist, pattern material, binder, fabrication liquid, and solution or liquid dispersion containing amino acid, protein, or calcium.

The liquid discharge apparatus may be an apparatus to move the liquid discharge head and the medium onto which liquid can adhere relative to each other. However, the liquid discharge apparatus is not limited to such an apparatus. For example, the liquid discharge apparatus may be a serial head apparatus that moves the liquid discharge head or a line head apparatus that does not move the liquid discharge head.

Examples of the liquid discharge apparatus further include: a treatment liquid applying apparatus that discharges a treatment liquid onto a sheet to apply the treatment liquid to the surface of the sheet, for reforming the surface of the sheet; and an injection granulation apparatus that injects a composition liquid, in which a raw material is dispersed in a solution, through a nozzle to granulate fine particle of the raw material.

The "liquid discharge unit" refers to a liquid discharge head integrated with functional components or mechanisms, i.e., an assembly of components related to liquid discharge. For example, the "liquid discharge unit" includes a combination of the liquid discharge head with at least one of a head tank, a carriage, a supply mechanism, a maintenance mechanism, or a main-scanning moving mechanism.

The above integration may be achieved by, for example, a combination in which the liquid discharge head and a functional part(s) are secured to each other through, e.g., fastening, bonding, or engaging, and a combination in which one of the liquid discharge head and the functional part(s) is movably held to the other. The liquid discharge head and the functional part(s) or unit(s) may be detachably attached to each other.

Examples of the liquid discharge unit include the liquid discharge unit 440 in which a liquid discharge head and a head tank are integrated to form a single unit, as illustrated in FIG. 11. Alternatively, the liquid discharge head and the head tank coupled (connected) to each other via, for example, a tube may form the liquid discharge unit as a single unit. A unit including a filter may further be added to a portion between the head tank and the liquid discharge head of the liquid discharge unit.

In another example, the liquid discharge unit may be an integrated unit in which a liquid discharge head is integrated with a carriage.

As yet another example, the liquid discharge unit is a unit in which the liquid discharge head and the main-scanning moving mechanism are combined into a single unit. The liquid discharge head is movably held by a guide that is a part of the main-scanning moving mechanism. Like the liquid discharge unit 440 illustrated in FIG. 12, the liquid discharge head, the carriage, and the main-scanning moving mechanism may form the liquid discharge unit as a single unit.

In another example, the cap that forms a part of the maintenance mechanism is secured to the carriage mounting the liquid discharge head so that the liquid discharge head, the carriage, and the maintenance mechanism are integrated as a single unit to form the liquid discharge unit.

Further, in still another example, the liquid discharge unit includes tubes connected to the liquid discharge head to which the head tank or the channel component is attached so that the liquid discharge head and the supply mechanism are integrated as a single unit, as illustrated in FIG. 13.

The main-scanning moving mechanism may be a guide only. The supply mechanism may be a tube(s) only or a loading device only.

The liquid discharge head is not limited to the type of pressure generator used. The pressure generator is not limited to the piezoelectric actuator (or a laminated-type piezoelectric element) described in the above-described embodiments, and may be, for example, a thermal actuator that employs a thermoelectric transducer element, such as a thermal resistor, or an electrostatic actuator including a diaphragm and opposed electrodes.

In the present specification, the terms "image formation," "recording," "printing," "image printing," and "fabricating" used herein may be used synonymously with each other.

Aspects of the present disclosure are, for example, as follows.

Aspect 1

A liquid discharge head includes a common chamber substrate having a supply-side common chamber and a collection-side common chamber, and a channel substrate having multiple individual chambers communicating with the supply-side common chamber and the collection-side common chamber. The common chamber substrate and the channel substrate are laminated one over another. The supply-side common chamber and the collection-side common chamber are arranged side by side on the individual chamber side. Each of the supply-side common chamber and the collection-side common chamber has two sidewalls in a direction in which the supply-side common chamber and the collection-side common chamber are adjacent to each other on the individual chamber side. One sidewall of the supply-side common chamber and one sidewall of the collection-side common chamber are adjacent to each other. The supply-side common chamber includes a first bridge bridging between one sidewall and the other sidewall of the supply-side common chamber and has rigidity. The collection-side common chamber includes a second bridge bridging between one sidewall and the other sidewall of the collection-side common chamber and has rigidity.

In other words, a liquid discharge head includes a nozzle plate, a common chamber substrate, a channel substrate, a first bridge, and a second bridge. The nozzle plate has multiple nozzles from each of which a liquid is dischargeable in a first direction. The common chamber substrate has a supply-side common chamber having a first supply sidewall and a second supply sidewall opposed to the first supply sidewall in a second direction orthogonal to the first direction, and a collection-side common chamber adjacent to the supply-side common chamber in the second direction with one side wall intervening between the supply-side common chamber and the collection-side common chamber. The collection-side common chamber has a first collection sidewall and a second collection sidewall opposed to the first collection sidewall in the second direction. The first supply sidewall and the first collection sidewall form opposite side faces of the one side wall. The channel substrate is laminated over the common chamber substrate in the first direction. The channel substrate has multiple individual chambers each communicating with the supply-side common chamber and the collection-side common chamber. The first bridge is disposed between the first supply sidewall and the second supply sidewall in the second direction to bridge the supply-side common chamber. The second bridge is disposed between the first collection sidewall and the second collection sidewall in the second direction to bridge the collection-side common chamber.

Aspect 2

In the liquid discharge head according to Aspect 1, the first bridge and the second bridge are opposed to each other via one sidewall of the supply-side common chamber and one sidewall of the collection-side common chamber.

In other words, the first bridge is opposed to the second bridge via the one side wall.

Aspect 3

In the liquid discharge head according to Aspect 2, the sidewalls of the supply-side common chamber and the collection-side common chamber are formed in the same direction, and multiple pairs of the first bridge and the second bridge opposed to each other are arranged in the direction of the sidewalls.

In other words, the liquid discharge head according to Aspect 2, further includes multiple first bridges including the first bridge and multiple second bridges including the second bridge. Each of the first supply sidewall, the second supply sidewall, the first collection sidewall, and the second collection sidewall having a side face extending in the first direction and a third direction orthogonal to the first direction and the second direction. Each of the multiple first bridges and the multiple second bridges are arrayed in the third direction.

Aspect 4

In the liquid discharge head according to Aspect 3, an interval of the adjacent pairs of the first bridge and the second bridge opposed to each other becomes narrower toward the center in the direction of the sidewalls.

In other words, a first interval between adjacent two of the multiple first bridges decreases toward a center of the common chamber substrate in the third direction, and a second interval between adjacent two of the multiple second bridges decreases toward the center of the common chamber substrate in the third direction.

Aspect 5

In the liquid discharge head according to any one of Aspects 1 to 4, a direction in which the common chamber substrate and the channel substrate are laminated one over another is defined as a lamination direction, and the lamination direction is referred to as a thickness direction of the common chamber substrate. The first bridge and the second bridge are disposed closer to the channel substrate than a midpoint of a thickness of the common chamber substrate.

In other words, the first bridge and the second bridge are disposed closer to the channel substrate than a midpoint of a thickness of the common chamber substrate in the first direction.

Aspect 6

The liquid discharge head according to any one of Aspects 1 to 5, further includes a nozzle plate having multiple nozzles communicating with the individual chambers. The nozzle plate is laminated over the channel substrate on a side opposite to the common chamber side. A direction in which the nozzles are arrayed is defined as a nozzle array direction. The direction in which the supply-side common chamber and the collection-side common chamber are adjacent to each other on the individual chamber side is perpendicular to the nozzle array direction.

In other words, the multiple nozzles respectively communicate with the multiple individual chambers. The nozzle plate is laminated over a first face of the channel substrate opposite to a second face over which the common chamber substrate is laminated. The multiple nozzles are arrayed in a third direction orthogonal to the first direction and the second direction.

Aspect 7

In the liquid discharge head according to any one of Aspects 1 to 6, the common chamber substrate, the first bridge, and the second bridge are formed of the same material, and the first bridge and the second bridge are formed integrally with the common chamber substrate to form a single unit.

In other words, the common chamber substrate, the first bridge, and the second bridge are formed of the same material. The first bridge and the second bridge are formed together with the common chamber substrate as a single unit.

Aspect 8

A liquid discharge unit includes the liquid discharge head according to any one of Aspects 1 to 7.

In other words, a liquid discharge unit includes multiple liquid discharge heads including the liquid discharge head according to any one of Aspects 1 to 7.

Aspect 9

The liquid discharge unit according to Aspect 8, further includes at least one of a head tank to store a liquid to be supplied to the liquid discharge head, a carriage to mount the liquid discharge head, a supply mechanism to supply the liquid to the liquid discharge head, a maintenance mechanism to maintain and recover the liquid discharge head, or a main-scanning moving mechanism to move the liquid discharge head in a main scanning direction. The at least one thereof is integrated with the liquid discharge head as a single unit.

In other words, a liquid discharge unit includes the liquid discharge head according to any one of Aspects 1 to 7 and at least one of: a head tank to store a liquid to be supplied to the liquid discharge head; a carriage to mount the liquid discharge head; a supply mechanism to supply the liquid to the liquid discharge head; a maintenance mechanism to maintain and recover the liquid discharge head; or a main-scanning moving mechanism to move the liquid discharge head in a main scanning direction, to form a single unit with the liquid discharge head.

Aspect 10

A liquid discharge apparatus includes the liquid discharge head according to any one of Aspects 1 to 7 or the liquid discharge unit according to Aspect 8 or 9.

In other words, a liquid discharge apparatus includes the liquid discharge head according to any one of Aspects 1 to 7, to discharge a liquid to a medium and a conveyor to convey the medium to a position facing the liquid discharge head, or a liquid discharge apparatus includes the liquid discharge unit according to Aspect 8 or 9, to discharge a liquid to a medium and a conveyor to convey the medium to a position facing the liquid discharge unit.

As described above, according to one aspect of the present disclosure, the liquid discharge head can be provided that prevents the vibration due to the deformation of the common chamber substrate to stabilize the discharge properties.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A liquid discharge head comprising:

a nozzle plate including multiple nozzles from each of which a liquid is dischargeable in a first direction;

a common chamber substrate including:

a supply-side common chamber including:

a first supply sidewall; and a second supply sidewall opposed to the first supply sidewall in a second direction orthogonal to the first direction; and a collection-side common chamber adjacent to the supply-side common chamber in the second direction, with one side wall intervening between the supply-side common chamber and the collection-side common chamber, the collection-side common chamber including:

a first collection sidewall; and a second collection sidewall opposed to the first collection sidewall in the second direction, and the first supply sidewall and the first collection sidewall forming opposite side faces of the one side wall;

a channel substrate laminated over the common chamber substrate in the first direction, the channel substrate including multiple individual chambers each communicating with the supply-side common chamber and the collection-side common chamber, a first bridge between the first supply sidewall and the second supply sidewall in the second direction to bridge the supply-side common chamber; and a second bridge between the first collection sidewall and the second collection sidewall in the second direction to bridge the collection-side common chamber, wherein the supply-side common chamber and the collection-side common chamber are adjacent in the first direction and the second direction.

2. The liquid discharge head according to claim 1, wherein;

the first bridge is opposed to the second bridge via the one side wall.

3. The liquid discharge head according to claim 2, further comprising:

multiple first bridges including the first bridge; and multiple second bridges including the second bridge, wherein each of the first supply sidewall, the second supply sidewall, the first collection sidewall, and the second collection sidewall including a side face extending in the first direction and a third direction orthogonal to the first direction and the second direction, and each of the multiple first bridges and the multiple second bridges are arrayed in the third direction.

4. The liquid discharge head according to claim 3, wherein;

a first interval between adjacent two of the multiple first bridges decreases toward a center of the common chamber substrate in the third direction; and a second interval between adjacent two of the multiple second bridges decreases toward the center of the common chamber substrate in the third direction.

5. The liquid discharge head according to claim 1, wherein;

the first bridge and the second bridge are disposed closer to the channel substrate than a midpoint of a thickness of the common chamber substrate in the first direction.

6. The liquid discharge head according to claim 1, wherein;

the multiple nozzles respectively communicate with the multiple individual chambers, the nozzle plate is laminated over a first face of the channel substrate opposite to a second face over which the common chamber substrate is laminated, and the multiple nozzles are arrayed in a third direction orthogonal to the first direction and the second direction.

7. The liquid discharge head according to claim 1, wherein;

the common chamber substrate, the first bridge, and the second bridge include the same material, and the first bridge and the second bridge are formed together with the common chamber substrate as a single unit.

8. A liquid discharge unit comprising multiple liquid discharge heads including the liquid discharge head according to claim 1.

9. A liquid discharge unit comprising:

the liquid discharge head according to claim 1; and at least one of:

a head tank to store a liquid to be supplied to the liquid discharge head;

a carriage to mount the liquid discharge head;

a supply mechanism to supply the liquid to the liquid discharge head;

a maintenance mechanism to maintain and recover the liquid discharge head; or a main-scanning moving mechanism to move the liquid discharge head in a main scanning direction, to form a single unit with the liquid discharge head.

10. A liquid discharge apparatus comprising:

the liquid discharge head according to claim 1, to discharge a liquid to a medium; and a conveyor to convey the medium to a position facing the liquid discharge head.

11. A liquid discharge apparatus comprising:

the liquid discharge unit according to claim 8, to discharge a liquid to a medium; and a conveyor to convey the medium to a position facing the liquid discharge unit.

12. The liquid discharge head according to claim 1, wherein:

the supply-side common chamber has an L-shape.

13. A liquid discharge head comprising:

a nozzle plate including multiple nozzles from each of which a liquid is dischargeable in a first direction;

a common chamber substrate including:

a supply-side common chamber including:

a first supply sidewall; and a second supply sidewall opposed to the first supply sidewall in a second direction orthogonal to the first direction; and a collection-side common chamber adjacent to the supply-side common chamber in the second direction, with one side wall intervening between the supply-side common chamber and the collection-side common chamber, the collection-side common chamber including:

a first collection sidewall; and a second collection sidewall opposed to the first collection sidewall in the second direction, and the first supply sidewall and the first collection sidewall forming opposite side faces of the one side wall;

a channel substrate laminated over the common chamber substrate in the first direction, the channel substrate including multiple individual chambers each communicating with the supply-side common chamber and the collection-side common chamber, a first bridge between the first supply sidewall and the second supply sidewall in the second direction to bridge the supply-side common chamber; and a second bridge between the first collection sidewall and the second collection sidewall in the second direction to bridge the collection-side common chamber, wherein the supply-side common chamber has an L-shape.

14. The liquid discharge head according to claim 13, wherein:

the first bridge is opposed to the second bridge via the one side wall.

15. The liquid discharge head according to claim 14, further comprising:

multiple first bridges including the first bridge; and multiple second bridges including the second bridge, wherein each of the first supply sidewall, the second supply sidewall, the first collection sidewall, and the second collection sidewall including a side face extending in the first direction and a third direction orthogonal to the first direction and the second direction, and each of the multiple first bridges and the multiple second bridges are arrayed in the third direction.

16. The liquid discharge head according to claim 15, wherein:

a first interval between adjacent two of the multiple first bridges decreases toward a center of the common chamber substrate in the third direction; and a second interval between adjacent two of the multiple second bridges decreases toward the center of the common chamber substrate in the third direction.

17. The liquid discharge head according to claim 13, wherein:

the first bridge and the second bridge are disposed closer to the channel substrate than a midpoint of a thickness of the common chamber substrate in the first direction.

18. The liquid discharge head according to claim 13, wherein:

the multiple nozzles respectively communicate with the multiple individual chambers, the nozzle plate is laminated over a first face of the channel substrate opposite to a second face over which the common chamber substrate is laminated, and the multiple nozzles are arrayed in a third direction orthogonal to the first direction and the second direction.

19. The liquid discharge head according to claim 13, wherein:

the common chamber substrate, the first bridge, and the second bridge include the same material, and the first bridge and the second bridge are formed together with the common chamber substrate as a single unit.

20. A liquid discharge apparatus comprising:

the liquid discharge head according to claim 13, to discharge a liquid to a medium; and a conveyor to convey the medium to a position facing the liquid discharge head.

* * * * *